United States Patent [19]
Panjwani et al.

[11] Patent Number: 5,863,378
[45] Date of Patent: Jan. 26, 1999

[54] APPARATUS FOR HEAT SEALING PLASTIC STRAPPING

[75] Inventors: Srichand Sitaldas Panjwani, Vernon Hills; Timothy H. Nelson, Winnetka, both of Ill.

[73] Assignee: Midwest Industrial Packaging, Inc., Lake Forest, Ill.

[21] Appl. No.: 878,311

[22] Filed: Jun. 18, 1997

[51] Int. Cl.$^6$ .................................................. B31F 5/00
[52] U.S. Cl. ......................... 156/359; 156/502; 156/510; 156/580; 156/583.1; 100/33 PB
[58] Field of Search .................... 156/359, 502, 156/510, 580, 581, 583.1, 73.5; 100/29, 33 PB

[56] References Cited

U.S. PATENT DOCUMENTS

| | | | |
|---|---|---|---|
| 3,269,300 | 8/1966 | Billett et al. | 100/8 |
| 3,397,105 | 8/1968 | Takami | 156/494 |
| 3,438,833 | 4/1969 | Nakano | 156/502 |
| 3,755,045 | 8/1973 | Takami | 156/366 |
| 3,944,460 | 3/1976 | Karr | 156/494 |
| 4,016,023 | 4/1977 | Takami | 156/359 |
| 4,063,985 | 12/1977 | Kyts | 156/359 |
| 4,288,270 | 9/1981 | Mossell et al. | 156/359 |
| 4,536,248 | 8/1985 | Bullington et al. | 156/502 |
| 4,661,185 | 4/1987 | Kobiella | 156/212 |
| 4,776,905 | 10/1988 | Cheung et al. | 156/73.5 |
| 4,871,414 | 10/1989 | Niedrig | 156/494 |
| 4,952,271 | 8/1990 | Cheung et al. | 156/502 |
| 5,267,508 | 12/1993 | Yoshino | 100/26 |
| 5,476,569 | 12/1995 | Harada | 156/502 |
| 5,514,237 | 5/1996 | Emenaker et al. | 156/159 |
| 5,632,851 | 5/1997 | Young | 156/494 |
| 5,653,095 | 8/1997 | Stamm | 53/592 |

*Primary Examiner*—James Sells
*Attorney, Agent, or Firm*—Dick and Harris

[57] ABSTRACT

An apparatus for heat sealing two pieces of plastic strapping together. The apparatus includes a heating element, upper and lower pressure elements, a rotation actuation member and a sealing actuation assembly. The heating element is movable between an engaged heating position —which orients the heat element between the pieces of plastic strapping —and a retracted position. The lower pressure element exerts pressure upon at least the bottom piece of plastic strapping during the heating of same by the heating element, and, in cooperation with the upper pressure element, upon both pieces of plastic strapping again during direct attachment of the melted portions of the plastic strapping after the heating element is relocated to its retracted position. The lower pressure element further releases pressure while facilitating the placement and removal of the pieces of plastic strapping between the upper and lower pressure elements. The lower pressure element also at least partially disengages the plastic strapping from the heating element so as to facilitate its retraction. The rotation actuation member is operably associated with the sealing actuating assembly to impart rotation to same, while sequencing the operations of the heating element and the upper and lower pressure elements through a uni-directional, rotational cycle, to, in turn, ultimately weld the pieces of plastic strapping together.

25 Claims, 7 Drawing Sheets

APPARATUS FOR HEAT SEALING PLASTIC STRAPPING

BACKGROUND OF THE INVENTION

The present invention relates in general to tooling for use in banding articles, and more particularly, to a banding apparatus that heat seals plastic strapping together, using a heating element.

Use of thermoplastic strapping to band an article or set of articles together is widely known. As is known, the thermoplastic strap is disposed about the article or articles, tensioned and then two portions of the strap are melted together. Usually, the banded portion of the strap is a portion of a larger roll of thermoplastic strapping. In such a case, the bonding is performed between the free end of the roll and a portion of the strap adjacent a cutting point. Thus, the sealing operation occurs between a first and second end of the plastic strapping. In all cases, the plastic strapping is required to be tensioned. This tensioning may be accomplished through the use of an integrated or separate tensioning mechanism.

The melting and affixation operations has been conventionally performed by one of two types of approaches: friction-weld melting and thermal heat-blade heating. A "friction-weld" apparatus works by rubbing the two strap ends together at relatively high speeds to heat the strapping by friction. Cheung, U.S. Pat. RE 31,353; Schaub et al., U.S. Pat. No. 3,058,513; Hull, U.S. Pat. No. 3,062,695; Gilmore, U.S. Pat. No. 3,709,758; Styner et al., U.S. Pat. No. 3,984,278; Cheung, U.S. Pat. No. 4,062,278; Lehman, U.S. Pat. No. 4,096,019; Wehr, U.S. Pat. No. 4,227,949; Toth, U.S. Pat. No. 4,377,428; Wehr, U.S. Pat. No. 4,450,032; Kobiella, U.S. Pat. No. 4,479,834; Fischer, U.S. Pat. No. 4,820,363; Niedrig, U.S. Pat. No. 4,871,414; Cheung et al., U.S. Pat. No. 4,952,271; Kagi, U.S. Pat. No. 5,058,365; Kobiella, U.S. Pat. No. 5,306,383; Kobiella, U.S. Pat. No. 5,350,472; and Harada, U.S. Pat. No. 5,476,569 are all representative of this type of "friction-weld" apparatus.

Thermal heating apparatuses work by bringing the strap ends into operable contact with a heated element, such as a knife or a blade. Bona, U.S. Pat. No. 2,582,581; Briscoe, U.S. Pat. No. 3,043,210; Nakano, U.S. Pat. No. 3,438,833; Osmalov, U.S. Pat. No. 3,542,627; Ross et al., U.S. Pat. No. 3,563,833; Takami, U.S. Pat. No. 3,755,045; Sato et al., U.S. Pat. No. 3,749,622; Tsuda, U.S. Pat. No. 3,767,512; Fuchs et al., U.S. Pat. No. 3,770,540; Wehr, U.S. Pat. No. 3,783,079; Takahashi, U.S. Pat. No. 3,863,557; Spears et al., U.S. Pat. No. 3,929,541; Burgheimer, U.S. Pat. No. 3,944,454; Wyse, U.S. Pat. No. 3,962,017; Andrews, U.S. Pat. No. 3,986,919; Takami, U.S. Pat. No. 4,016,023; Kyts, U.S. Pat. No. 4,063,985; Johnson. III et al., U.S. Pat. No. 4,157,274; Gould, U.S. Pat. No. 4,158,711; Pennington, 4,240,855; Kyts, U.S. Pat. No. 4,240,865; Mossell et al., U.S. Pat. No. 4,288,270; Struve, U.S. Pat. No. 4,445,955; Ford, U.S. Pat. No. 4,504,353; Ford et al., U.S. Pat. No. 4,595,433; Kobiella, U.S. Pat. No. 4,661,185; Forthmann, U.S. Pat. No. 4,743,333; Cheung et al., U.S. Pat. No. 4,776,905; Emenaker et al., U.S. Pat. No. 5,514,237; Canadian Pat. No. 700,336; UK Patent No. 929,803; UK Patent No. 1,039,898; UK Patent No. 1,045,279; UK Patent No. 1,193,618; and UK Patent application No. 2,082,500, in various environments disclose this type of apparatus.

There are various disadvantages associated with the apparatuses disclosed in these patent references. Some units are not portable, thus significantly limiting their usefulness in banding various articles. Some units are overly complex and bulky. Further, several manual units require ultimate end-user control of the timing and sequencing. Yet other units rely on pneumatic pressure to control operation timing, thus, requiring a constant pressure source. Yet other units require microprocessor control and sequencing, which increases the expense of those units. Still further, many units fail to provide safety enclosures to protect users from the high-temperature heating elements necessary to melt the thermoplastic strapping. Many prior units further require both strap ends to be tensioned prior to the sealing operation.

It is an object of the present invention to avoid these problems. In particular, it is an object of the present invention to provide a manual, rotationally actuated heat sealing unit toward providing a less expensive, more reliable apparatus. Rotational actuation facilitates an even, continuous application of rotational energy by the end-user, in turn, imparting such an even operation to the heat sealing operations, themselves.

It is an associated object of the present invention to require only a unidirectional motion for end-user actuation of the heat sealing apparatus toward avoiding variations in heat sealing due to differences in end-user's manual dexterity, strength, time-interval and abilities to understand otherwise complex instructions.

It is a further associated object of the present invention to control the heat sealing apparatus to fully utilize the various rotational components of the apparatus toward ensuring proper time allocation amongst the plurality of step conducted by the apparatus to acheive heat sealing of the plastic strapping.

It is a further object of the present invention to provide a heat sealing apparatus that is easy to operate, thus, requiring little training to ensure consistent desirable operation of the unit.

It is yet another object of the present invention to provide a portable unit to facilitate carrying and placement of the unit in various locations.

In is an additional object of the present invention to provide a reliable heating-element based heat sealing apparatus, that provides various protections to the end-user to prevent inadvertent injury.

These and other objects of the present invention will become apparent in light of the attached specification, drawings and claims.

SUMMARY OF THE INVENTION

The present invention comprises an apparatus for heat sealing ends of plastic strapping together —typically for banding together a plurality of packages, parcels or articles —though can be directed to any applications of plastic strapping. The heat sealing apparatus includes a housing, a sealing actuation assembly, a heating element, an upper pressure element, a lower pressure element and a rotation actuation member. The housing has an interior, an exterior and an opening. The housing opening is disposed so as to receive at least a portion of the first and second ends of plastic strapping with the first end being orientatable on top of the second end of plastic strapping; all within the housing interior.

The sealing actuation assembly, at least of portion of which is operably positioned within the housing, controls and sequences operations associated with the heat sealing of the plastic strapping ends. The rotation actuation member is operably associated with said sealing actuating assembly for imparting rotation to said sealing actuation assembly. The sealing actuating assembly controls and sequences the operations of heating element and upper and lower pressure elements through a unidirectional, rotational cycle, to, in turn, weld the portion of the first end of plastic strapping to the portion of the second end of plastic strapping. In a preferred embodiment, the sealing actuation assembly, upon completion of the unidirectional rotational cycle, further rotates -- to reset the sealing actuating assembly for a subsequent like cycle of control and sequencing, which may occur in a direction opposite to that of the unidirectional rotational cycle; but with safeguards to insure limits on rotation so as to avoid inadvertent sequencing and operation of the strap joinder procedure.

The heating element is operably disposed within the housing interior, for positioning between the plastic strapping ends. Preferably, the heating element is operably connected to the sealing actuation assembly and disposed so as to move between an engaged heating position and a retracted position. The engaged position orients the heating element operably between the ends of plastic strapping and the retracted position orients the heating element in a position isolated from the plastic strapping ends. The heating element has a top surface and a bottom surface opposite the top surface.

The upper and lower pressure elements are in operable association with the sealing actuation assembly. The lower pressure element sequentially exert upward pressure upon the plastic strapping ends during heating of the plastic strapping ends by the heating element and again during direct attachment of the melted portions after the heating element is relocated to its retracted position. The upper pressure element exerts pressure during direct attachment of the melted portions after the heating element is relocated to its retracted position. These upper and lower pressure elements release their respective downward and upward pressure to facilitate placement of the plastic strapping ends between the upper and lower pressure elements, before engaging the first and second ends with the heating element, and to at least partially disengage the first and second plastic strapping ends from the heating element so as to facilitate retraction of the heating element after engagement with the heating element -- to, in turn, further press the melted portions of the first and second plastic strapping ends after heating so as to weld one end to the other. In a preferred embodiment, the upper pressure element is a self-adjusting stationary platen and the lower pressure is movable in the vertical direction. In this embodiment, the second plastic strapping end need not be pre-tensioned to facilitate heat sealing. In yet other embodiments, the upper pressure element moves while the lower element is stationary. Alternatively, both pressure elements are movable in a vertical manner. In one further embodiment, at least one of the upper and lower pressure elements includes an embossing member operably disposed thereon so as to imprint an indicia on the portion of at least one of the first and second plastic strapping ends and/or the joint formed therebetween by the heat sealing process.

The sealing actuation assembly includes a primary rotary element directly attached to the rotational actuation member towards said control and sequencing of said operations of said heat sealing apparatus. This primary rotary element is a primary gear. In one such embodiment, the sealing actuation assembly further includes a plurality of secondary rotary elements, each of the plurality of secondary rotary elements cooperating with the primary rotary element to control and sequence the operations of the heat sealing apparatus.

The plurality of secondary rotary elements includes a first planetary gear in operable contact with the primary rotary element, the first gear being mounted on a shaft. In this preferred embodiment, the plurality of secondary rotary elements further includes a heating element cam operably mounted to the shaft and operably connected to the heating element. The heating element cam is configured to move the heating element between the retracted and engaged heating positions in accordance with the control and sequence of the operations of the rotationally activated heat sealing apparatus. This preferred embodiment further includes at least one pressure element cam operably mounted to the shaft which is operably connected to at least one of the upper and lower pressure elements.

In one embodiment, the rotational activation member comprises a manual lever operably mounted on the housing exterior. The manual lever has a starting position and a finishing position wherein rotation of the manual lever from the starting position to the finishing position prompts the controlling and sequencing of all of the operations of the apparatus. In this embodiment, the heat sealing apparatus further includes first means for precluding partial cycling of the operations of the heating element and the upper and lower pressure elements by precluding movement of the manual lever back to the starting position until the lever has been advanced to its "finished" position. This first precluding means may include a first spring-biased pawl operably disposed so as to engage teeth on said primary gear to prevent rearward motion of the primary gear. A first pin is disposed on an outer face of the primary gear positioned so as to disengage the first spring-biased pawl from the teeth on the primary gear upon movement of the manual lever to the "finished" position. A second pin is disposed on the outer face of the primary gear positioned so as to re-engage the first spring-biased pawl with the teeth on the primary gear upon movement of the manual lever to the starting position.

The apparatus may additionally include second means for precluding partial cycling of the operations of the heating element and the upper and lower pressure elements by precluding movement of the manual lever to the finishing position during a return counter-rotational stroke toward the starting position, until the manual lever has been returned to the starting position in its first rotational direction.

This second precluding means may include a second spring-biased pawl operably disposed so as to engage teeth on the primary gear to prevent forward motion; a third pin disposed on an outer face of the primary gear positioned so as to engage the first spring-biased pawl with the teeth on the primary gear upon movement of the manual lever to the finishing position; and a fourth pin disposed on the outer face of the primary gear positioned so as to disengage the first spring-biased pawl from the teeth on the primary gear upon movement of the manual lever to the starting position.

In a preferred embodiment, the heating element moves substantially horizontally between the retracted and engaged heating positions and substantially perpendicular to the longitudinal axis of the plastic strapping. The heat sealing apparatus further includes a vertically-positionable plate operably mounted on the housing so as to allow horizontal insertion of the first and second plastic strapping ends prior to the heat sealing and to prevent the first and second plastic strapping ends from being pushed horizontally out of the housing during the substantially horizontal movement of the heating element into the engaged heating position between the first and second ends. In this embodiment, the vertically-oriented plate may further serve to substantially close the housing opening to, in turn, substantially preclude access by an end user to the heating element to minimize potential for injury from the heating element.

The housing opening may be further configured so as to substantially preclude access by an end user to the heating element to minimize potential for injury from the heating element. Strap cutting can be accomodated after strap sealing via a conventional technique.

DETAILED DESCRIPTION OF THE DRAWINGS

While this invention is susceptible of embodiment in many different forms, there is shown in the drawings, and will herein be described in detail, a number of embodiments, with the understanding that the present disclosure can be considered as an exemplification of the principles of the invention and is not intended to limit the invention to the embodiments illustrated.

Figure 1:
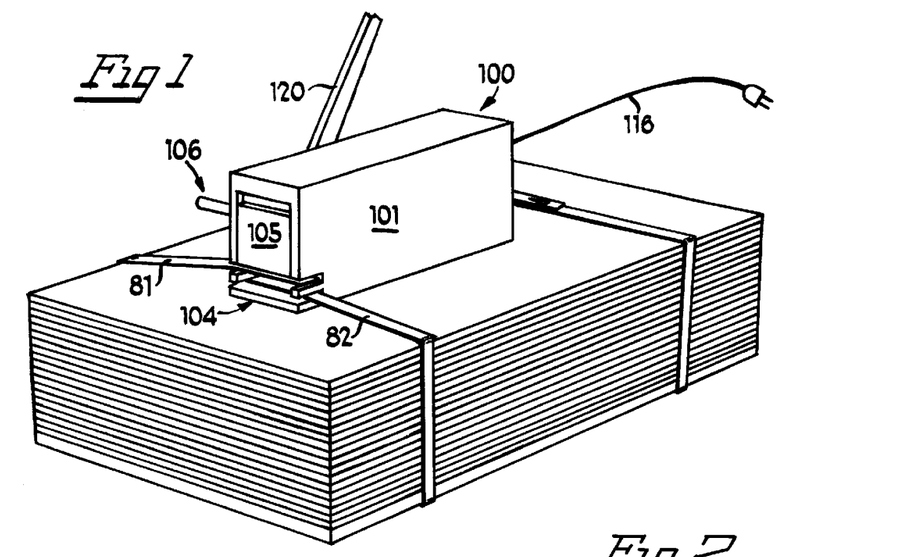
FIG. 1 of the drawings is a perspective view of the present heat sealing apparatus disposed on a stack of articles to be banded together showing, in particular, the vertically-oriented plate open to receive first and second ends of plastic strapping.
Figure 3:
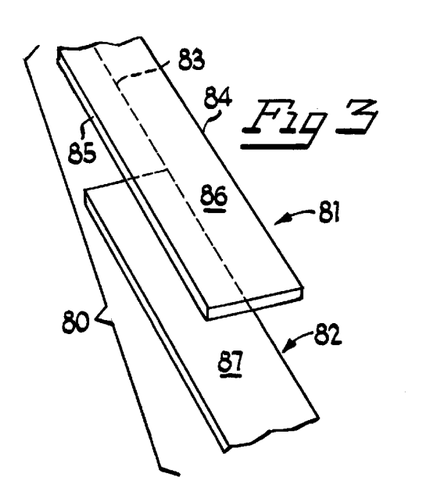
FIG. 3 of the drawings is a exploded perspective view of the first and second plastic strapping ends as they would be inserted into the housing opening of the heat sealing apparatus.

FIG. 1 of the drawings is a perspective view of the present heat sealing apparatus 100. Heat sealing apparatus 100 includes housing 101, which has an interior (portions of which are shown in FIGS. 4 through 8 of the drawings) and opening 104. As shown in FIG. 1, apparatus 100 may be configured so as to be portable for easy placement on a set of materials to be banded together. As shown in FIG. 1, opening 104 is disposed so as to horizontally receive at least a portion of first plastic strapping end 81 and second plastic strapping end 82. As shown in FIG. 3, plastic strapping 80, which is made of a thermoplastic material and sold in rolls, has longitudinal axis 83, first edge 84, and second edge 85. Strap 80 is horizontally inserted into housing 100 via opening 104 with portion 86 of first plastic strapping end 81 on top of portion 87 of second plastic strapping end 82, as shown in FIG. 3. An electrical power cord 116 supplies power to apparatus 100 for use in heating an element within housing interior 102 toward melting portions of plastic strapping 80 when the straps are operably disposed within the interior of the housing 101.

Figure 2:
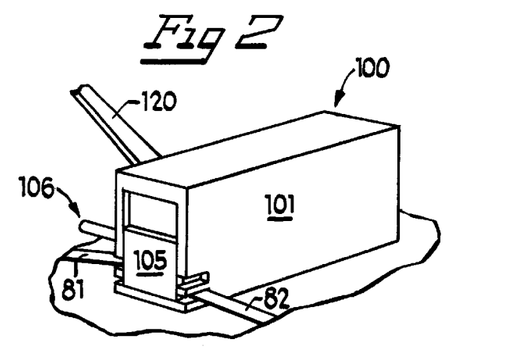
FIG. 2 of the drawings is a perspective view of the present heat sealing apparatus showing, in particular, the vertically-oriented plate closed to prevent ejection of the strap ends and to protect the end user from the heating element.

In one embodiment, housing 101 has slidably mounted thereon vertically-orientable plate 105. Vertically-orientable plate 105 is configured to be raised (as shown in FIG. 1) to allow horizontal insertion of the first and second ends of plastic strapping 80 prior to heat sealing and lowered (as shown in FIG. 2) to prevent plastic strapping 80 from being pushed horizontally out of housing 101 as may be caused by the heating element as it moves horizontally into its engaged heating position between said first and second ends of plastic strapping. As shown, vertically-orientable plate 105 may be operated by handle 106 or alternatively by a fulcrum-lever arrangement (not shown). Additionally, plate 105 serves to substantially close housing opening 104 during the sequence of strap joinder to, in turn, substantially precluding access by an end user to the heating element, thus, minimizing the potential for injury from high temperatures achieved by the heating element. In fact, housing opening 104, itself, has been configured to be sufficiently small so as to substantially preclude access by an end user to the heating element to minimize the potential for injury from the heating element.

Apparatus 100 performs a number of operations toward providing a completed heat seal of the plastic strapping. In particular, apparatus 100: (1) accepts operable insertion of the two plastic strapping ends; (2) relocates a heating element between the two plastic strapping ends; (3) simultaneously applies pressure on the plastic strapping and heating element; (4) partially releases pressure on the plastic strapping to allow relocation of the heating element; (5) relocates the heating element; (6) recompresses the two plastic strapping ends together in order to weld them together; (7) releases pressure on the two plastic strapping ends; and (8) allows unloading of the welded plastic strap. As will be discussed hereinbelow, each of these operations in acheived through a continuous rotational, unidirectional operation of a manual lever, thus, providing the numerous advantages discussed throughout this specification, including, but not limited to more uniform heat sealing of the plastic strapping between various users.

As shown in FIG. 1, an end-user places apparatus 100 on top of a bundle of articles to be banded together, lifts vertically-orientable plate 105 via handle 106 and inserts first plastic strapping end 81 on top of second plastic strapping end 82 horizontally into housing interior 102 via housing opening 104 (in the manner shown in FIG. 3). The end-user then drops vertically-orientable plate 105. In a preferred embodiment, at this point the end-user would only have to tension first plastic strapping end 81 in order to facilitate heat sealing, using a separate tensioning device as in known in the art. Following tensioning of first plastic strapping end 81, the sealing operation can begin.

As shown in FIG. 1, manual lever 120 begins in its "starting position." From this position an end-user will manually advance manual lever 120 in a forward direction toward the finished position of manual lever 120, shown in FIG. 2. During this unidirectional rotation all of the heat sealing operations of apparatus 100 are conducted, unlike prior apparatuses that required both forward and reverse rotation or multiple actuations of the manual lever or a manually-timed dwell time for the sealing operation. In this manner, apparatus 100 minimizes variations in end-user operation of the apparatus, thus, leading to better more uniform heat sealing of the plastic strapping.

FIGS. 4 through 8 of the drawings show the mechanical elements disposed within interior 102 of housing 101 of the heat sealing apparatus, as well as various stages of their operation and sequencing. Certain smaller details -- which may be of conventional configuration known to one of ordinary skill in the art -- have been omitted from these drawings for ease of illustration. Furthermore, these smaller details are not necessary for a complete understanding of the principles and operation of the present invention, which will now be explained.

Figure 4:
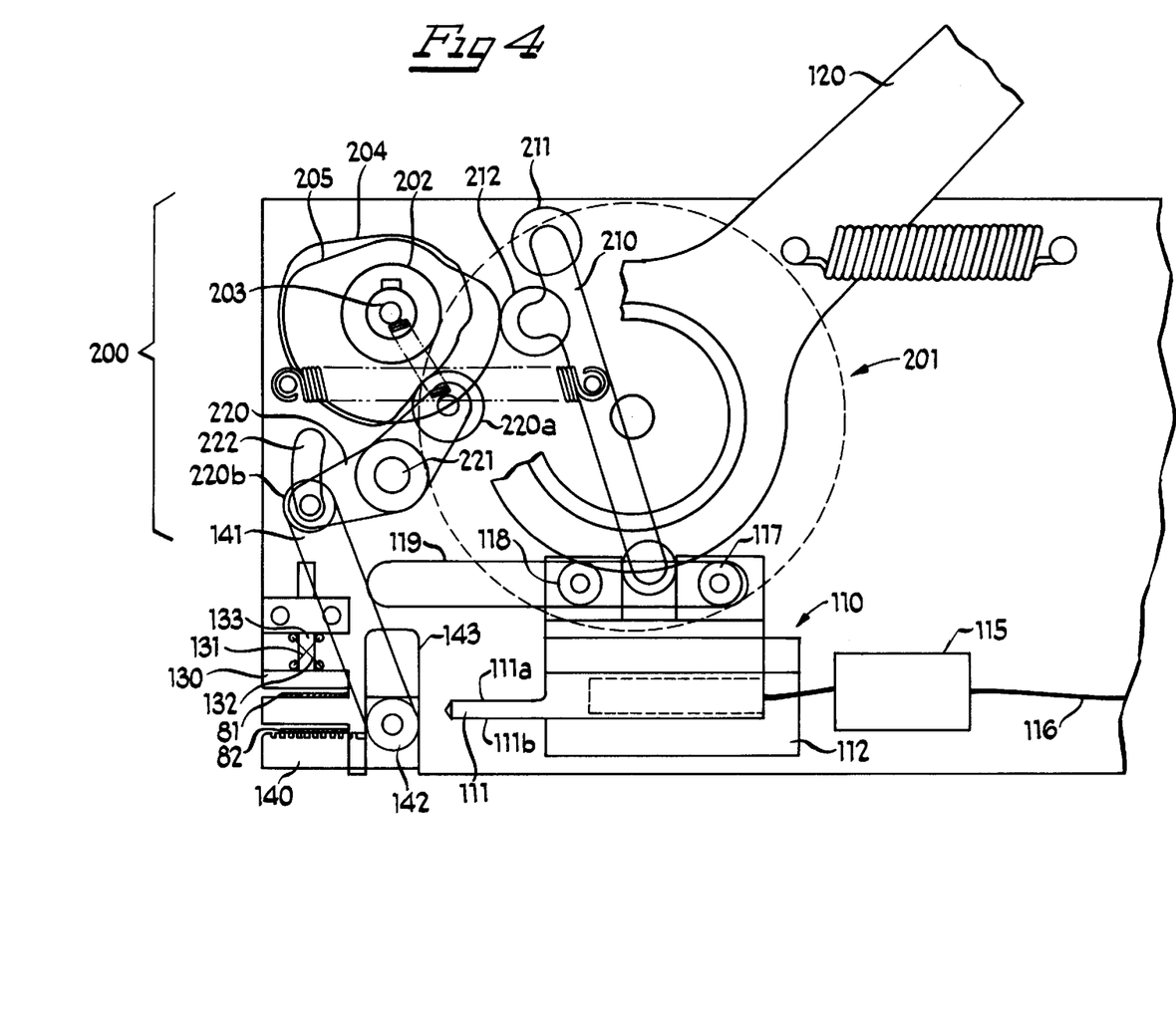
FIG. 4 of the drawings is an elevated side view of the interior of the apparatus showing the heating and pressure elements in their disengaged positions.

FIG. 4 shows the interior of apparatus 100 after first end 81 and second end 82 of the plastic strapping have been loaded into the interior of housing 101. At this juncture, manual lever 120 is in its starting position and heating element 110, upper pressure element 130 and lower pressure element 140 are in their disengaged positions.

Figure 5:
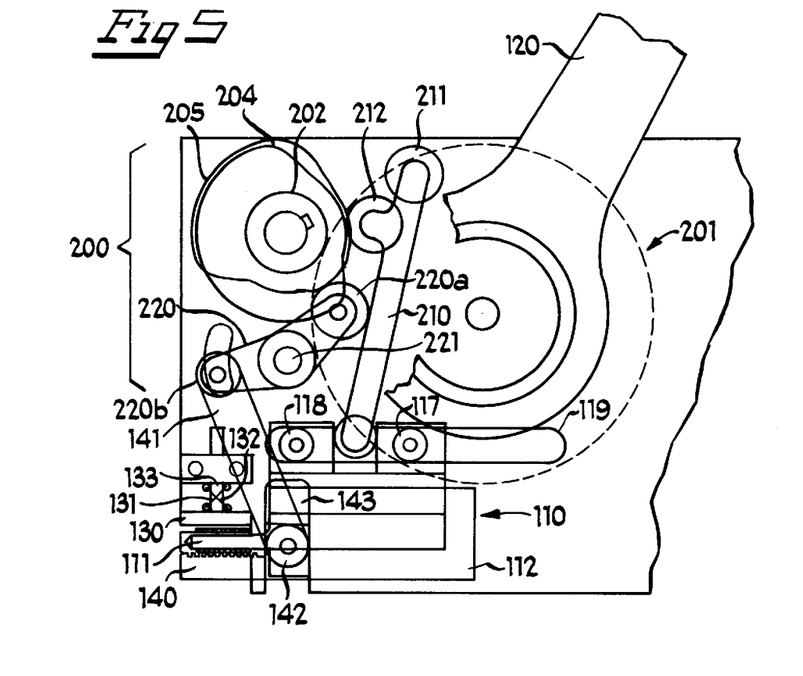
FIG. 5 of the drawings is an elevated side view of the interior of the apparatus showing the heating and lower pressure element in their engaged position in which the lower pressure element exerts upward pressure and the heating element is heating the first and second ends of the plastic strapping.

As shown in FIG. 5, as the user begins to rotate manual lever 120 forward, sealing actuation assembly 200 serves to convert this manual rotation into sequential movement of heating element 110, upper pressure element 130 and lower pressure element 140. As will be discussed in detail hereinbelow, the slight rotation of manual lever 120, shown in FIG. 5, prompts heating element 110 to move horizontally into its engaged heating position between first and second plastic strapping ends, while lower pressure element 140 is moved simultaneously upward, thus, pressing second plastic strapping end 82 against the lower face of heating element 111. In a preferred embodiment, first plastic strapping end 81 is tensioned by a tensioning mechanism (not shown). This tensioning will cause first plastic strapping end 81 to be in operable association with the upper face of heating element 111 so as to facilitate melting of same. In another embodiment, upper pressure element 130 can be disposed in a position such that as lower pressure element 140 exerts upward pressure, upper pressure element 130 exerts downward pressure upon first plastic strapping end 81 to bring it into further association with the upper face of heating element 111. As the end-user continues rotation of manual lever 120, sealing actuation assembly insures that this configuration of the heating and pressure elements is maintained for sufficient time to melt the plastic strapping for later welding of one to the other.

Figure 6:
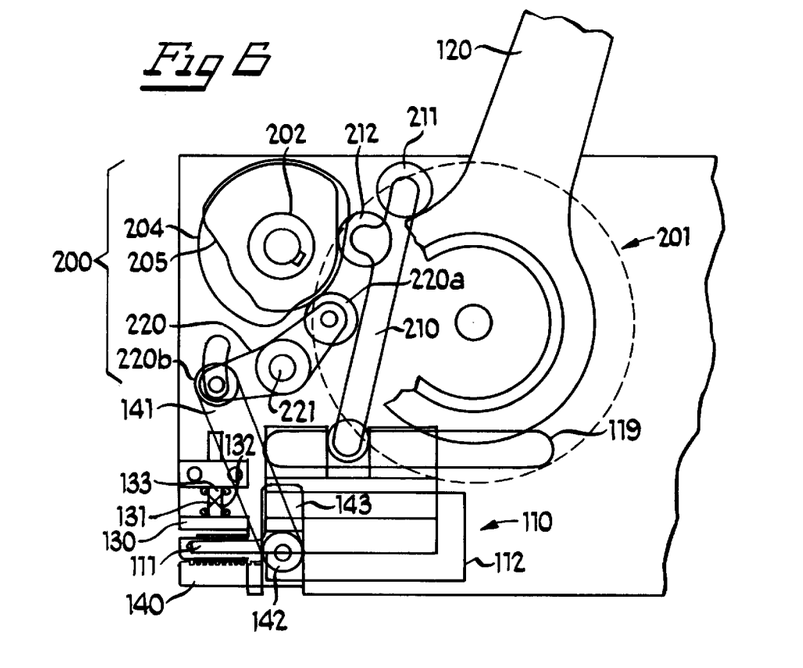
FIG. 6 of the drawings is an elevational side view of the interior of the apparatus showing the partially disengaged position of the lower pressure element and the heating element, as they begin to withdraw from positions that operably melt the first and second ends of plastic strapping.
Figure 7:
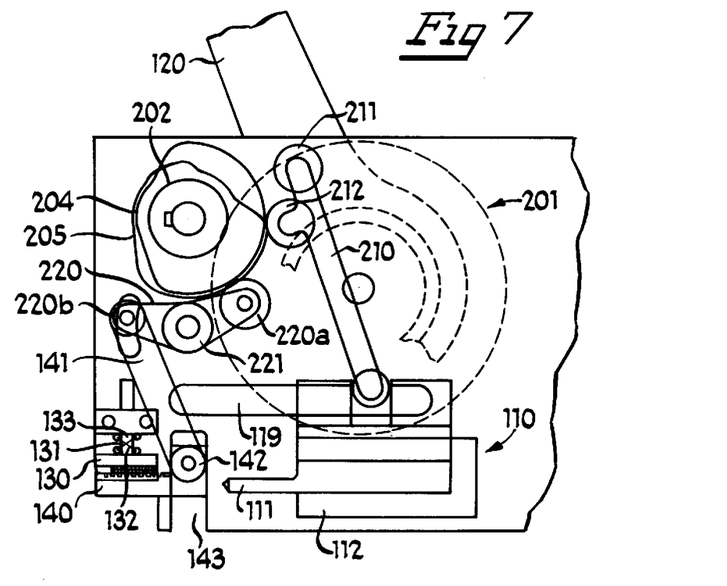
FIG. 7 of the drawings is an elevational side view of the interior of the apparatus showing the upper and lower pressure elements in their engaged positions after the heating element has been removed toward adhering the melted first and second strap ends together.
Figure 8:
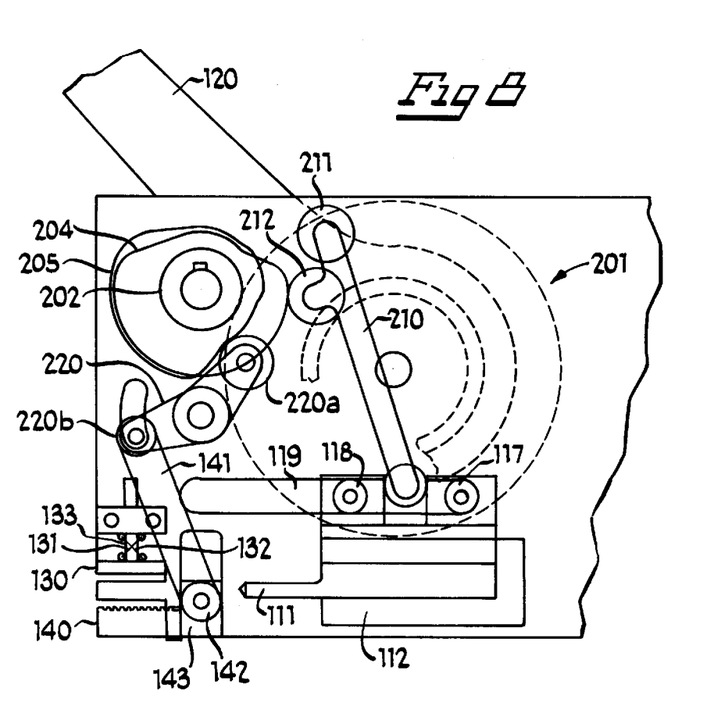
FIG. 8 of the drawings is an elevational side view of the interior of the apparatus showing the final retracted positions of the heating element and upper and lower pressure elements.

As shown in FIG. 6, the end-user's continuation of forward rotation causes lower pressure element 140 to be partially lowered, thus releasing some of the pressure on the first and second ends of plastic strapping 80 to facilitate retraction of heating element 110 to its disengaged position. Withdrawal of heating element 110 to its disengaged position is also prompted by the continuing forward rotation of manual lever 120, such that, as shown in FIG. 7, heating element 110 is completely withdrawn. At this point, as also shown in FIG. 7, sealing actuation assembly 200 raises lower pressure element 140 so as to press the first and second plastic strapping ends 81 and 82 together so as to bind them together. As shown in FIG. 8, as forward rotation of manual lever 120 still continues lower pressure element 140 is lowered into its disengaged position and the sealed plastic strapping is removed.

In this manner, all operations of the heat sealing apparatus are performed during only the forward rotation of manual lever 120 thus avoiding potential problems caused by requiring a bi-directional manual operation of such a device. After completion of the heat sealing operation, end-user operation of the device is less critical, accordingly, in a preferred embodiment manual lever 120 is rotated in the reverse direction to return the apparatus to its starting configuration. However, yet other embodiments wherein manual lever 120 can be rotated forward back to the starting while be disengaged from the sealing actuation assembly are contemplated.

As shown in FIGS. 10 through 15, apparatus 100 may further include first and second means for precluding rotation of manual lever 120. In particular, the first means serves to prevent an end-user from altering the predetermined cycle of apparatus 100 by rotating manual lever 120 is the rearward direction at any time prior to completion of the sequence of operations described above. The second means serves to prevent an end-user from beginning forward motion of manual lever 120, which could, in turn, undesirably reengage operation of apparatus 100 in the middle of its sequence until the lever has been fully returned to its starting position.

Figure 10:
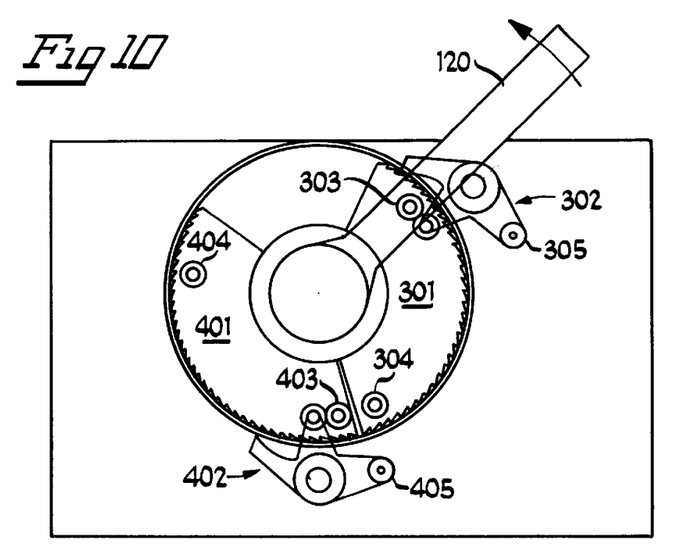
FIG. 10 of the drawings is an elevational side view of the first and second means for precluding partial rotation of the manual lever, showing, in particular, the manual lever in its starting position ready to advance toward its finished position with the first precluding means engaged to prevent rearward motion of the manual lever and the second precluding means disengaged to allow forward motion of the manual lever.
Figure 12:
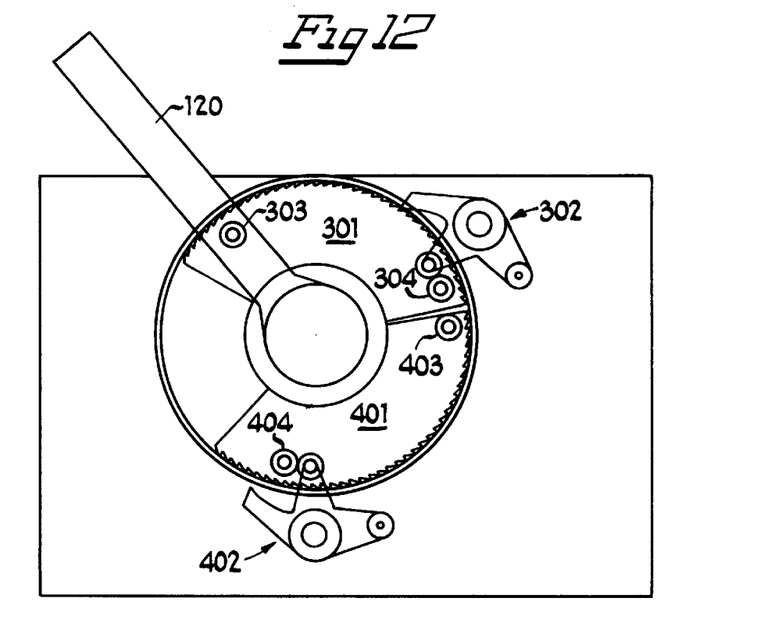
FIG. 12 of the drawings is an elevational side view of the first and second means for precluding partial rotation of the manual lever, showing, in particular, the manual lever immediately prior to its finished position with the second pin of first precluding means poised to disengage the first spring-biased pawl of first precluding means from its associated ratchet and the second pin of the second precluding means poised to engage the second spring-biased pawl of the second precluding means with its associated ratchet to allow rearward movement of the manual lever.
Figure 13:
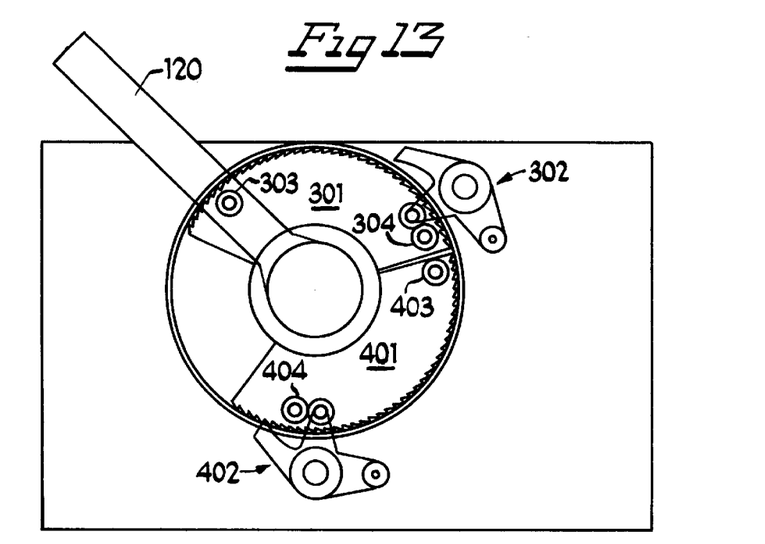
FIG. 13 of the drawings is an elevational side view of the first and second means for precluding partial rotation of the manual lever, showing, in particular, the manual lever in its finished position with the first precluding means disengaged to allow rearward motion of the manual lever and the second precluding means engaged to prevent further forward motion of the manual lever.
Figure 14:
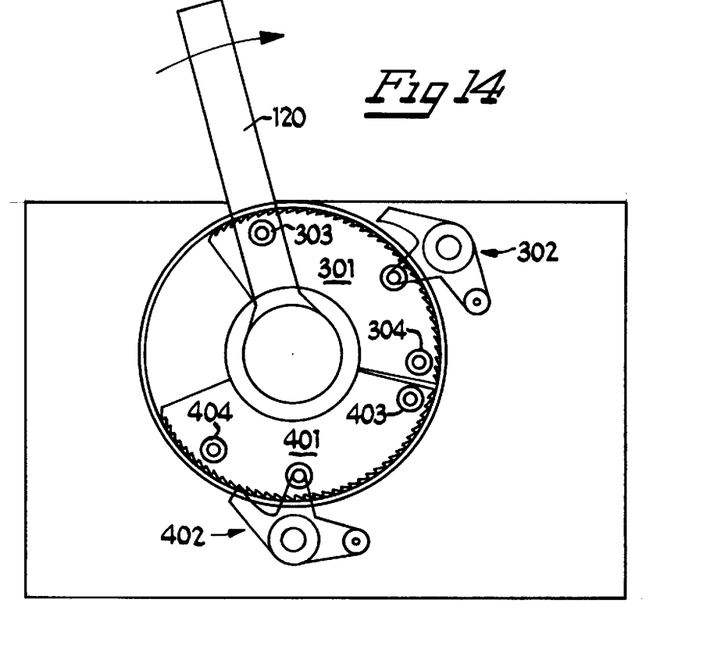
FIG. 14 of the drawings is an elevational side view of the first and second means for precluding partial rotation of the manual lever, showing, in particular, the manual lever returning toward its starting position with the first precluding means disengaged and the second precluding means engaged to prevent forward motion of the manual lever and, in turn, partial actuation of the heat sealing sequence.
Figure 15:
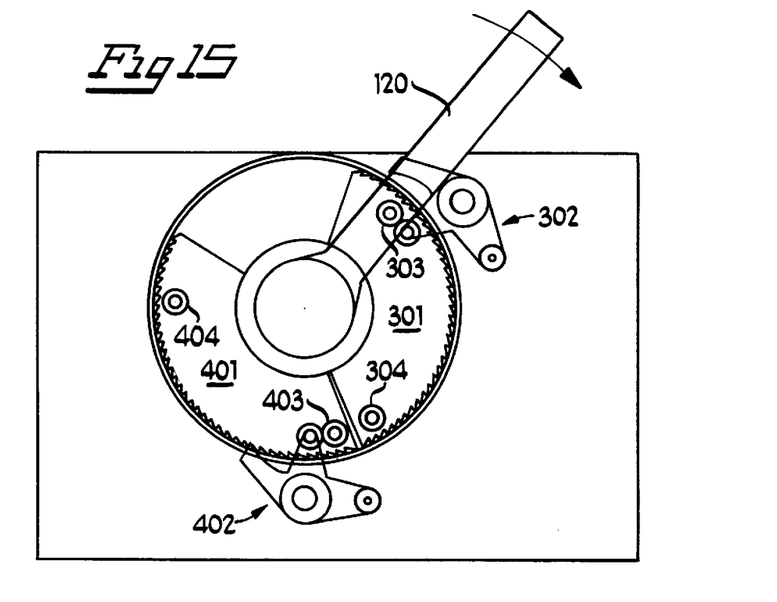
FIG. 15 of the drawings is an elevational side view of the first and second means for precluding partial rotation of the manual lever, showing, in particular, the manual lever immediately prior to its starting position with the first pin of first precluding means poised to engage the first spring-biased pawl of first precluding means with its associated ratchet and the first pin of the second precluding means poised to disengage the second spring-biased pawl of the second precluding means from its associated ratchet to allow forward movement of the manual lever.

In particular, FIG. 10 corresponds to FIG. 4, in that it shows the starting position of manual lever 120. As shown in FIG. 10, first and second precluding means are configured to allow forward rotation of manual lever 120 from its starting to its finished position. This configuration continues through FIGS. 11 and 12 and 13. In FIG. 12, manual lever 120 is almost in its finished position and pins 304 and 404 associated with respective ones of the precluding means are poised to reset the precluding means for reverse rotation of manual lever 120. As shown in FIG. 13, pins 304 and 404 have engaged and disengaged spring-biased pawls 302 and 402 with ratchets 301 and 401, respectively. Thus, setting apparatus 100 for a return rotation of manual lever 120. Similarly, FIG. 14 shows continuing reverse rotation as facilitated by the first and second precluding means. In FIG. 15, manual lever 120 is almost in its starting position and pins 303 and 403 associated with respective ones of the precluding means are poised to reset the precluding means for forward rotation of manual lever 120. The resulting configuration in shown in FIG. 10.

Accordingly, apparatus 100 eliminates many of the concerns associated with manual operation of the sequencing of a heating sealing apparatus via a manual lever. Initially, all operations are conducted during the forward rotation of manual lever 120 through the use of sealing actuation assembly 200. Further, partial forward operation is precluded by first precluding means that requires complete forward rotation of manual lever 120 before any reverse rotation can be performed. Additional, partial rearward movement of the lever is precluded by second precluding means, thus ensuring that apparatus 100 is fully reset by the operator prior to commencing another sealing operation. Yet further, horizontal motion of the lower pressure element avoids the need to tension the lower piece of plastic strapping, thus leading to better engagement between second end 82 of plastic strapping 80 and the lower face of heating element 110 and, in turn, better melting and affixation between the first and second ends. Still further, the housing minimizes the potential for user injury and also the possibility of inadvertent ejection of the plastic strapping during the heating operation.

As shown in FIG. 4, heating element 110 is operably disposed within housing interior 102 and is operably connected to electrical power source 115. Electrical power source 115 may be switched by a manual switch disposed on the exterior of housing 101. Alternatively, power source 115 may run so long as it is physically connected to mains power via electrical connection 116 (shown in FIG. 1). Of course, other power sources, such as one or more batteries, may be used to supply power to power source 115, so long as the power supply requirements of heating element 110 can be met. In a preferred embodiment, power source 115 is configured for a one hundred and ten volt source. However, as is known to those of ordinary skill in the art, power source 115 can be constructed for various line voltages and to provide various power outputs for use in apparatus 100 without departing from the scope of the present invention. As would also be known to those of ordinary skill in the art, electrical power source 115 can be deployed outside of housing 101 and connected to heating element 110 within housing 101 via a suitable electrical cable (not shown). In either configuration, the output of electrical power source 115 is placed in series with particular portions of heating element 110, as shown in FIG. 4. In one embodiment, electrical power source 115 may also include temperature sensing circuitry that senses the temperature of heating element 110 and temporarily disconnects power from heating element 110 upon reaching a predetermined temperature. This predetermined temperature may be set at the factory or set in the field, as is known by those of ordinary skill in the art. Further, electrical power source 115 may also include circuitry that performs a "time-out" feature that disconnects power from heating element 110 to conserve energy, as well as, to minimize the risk of prolonged and unnecessary heating of articles upon which apparatus 100 may be placed. A reset switch (not shown) may be disposed on the exterior of housing 101 to reconnect power after a "time-out." Alternatively, the end-user can physically disconnect electrical cord 116 from the wall socket and then reconnect it to reset the apparatus.

Heating element 110 (shown in FIGS. 4 through 8) includes an element 111 formed of electrically resistive material such that the flow of electrical current through electrically resistive material causes the temperature of heating element 110 to increase. This electrical current is provided by power source 115, which is connected in series with element 111. One such electrically resistive material that may be used in element 111 is stainless steel. For instance, by applying 75–100 amps across a stainless steel element, a temperature of approximately six hundred to one thousand degrees Fahrenheit can be achieved in less than fifteen seconds. Of course, other materials may be utilized so long as heating element 110 achieves the minimum temperature sufficient to melt the thermoplastic material from which plastic strapping 80 is formed. Element 111 has a top side 111a and a bottom side 111b. As shown in FIGS. 4 through 8, the distal end of element 111 can be formed in the shape of a wedge, also referred to as a blade or knife. In this manner the heated portion of heating element 110 can be inserted between first end 81 and second end 82 of plastic strapping 80 in order to melt portions of those ends.

Heating element 110 may further include insulating material 112 disposed about element 111. This insulating material may be formed of ceramic, glass wool, mica or other similar insulating materials. The thickness of the insulating material depends upon the operating temperatures and insulating materials used. As shown in FIGS. 4 through 8, in a preferred embodiment, insulating material 112 is operably connected to rollers 117 and 118 through various means of fastening such as by adhesive, screws, rivets, and clips. Rollers 117 and 118 are disposed within guide 119, which is configured so as to guide the movement of heating element 110 between an engaged heating position (shown in FIG. 5) and a retracted position (shown in FIGS. 4, 7 and 8). Although the use of rollers tends to minimize frictional opposition to the movement of heating element 110, other transmission means can be substituted to slidably mount heating element 110 to guide 119.

As shown in FIG. 4, the retracted position orients heating element 110 in a position isolated from plastic strapping 80, so as to minimize any heating of the plastic strapping by the heating element. The engaged position (which is shown in FIG. 5) orients at least a portion of element 111 of heating element 110 between first end 81 and second end 82 of plastic strapping 80. Heating element 110 is moved substantially horizontally between the retracted and engaged heating position and then back to the retracted position by the sealing actuation assembly, which is discussed fully hereinbelow.

In a preferred embodiment, upper pressure element 130 (shown in FIGS. 4 through 8) is disposed above and proximate to housing opening 104. In this embodiment, upper pressure element 130 is spring loaded by springs 131 and 132 mounted about stem 133 of upper pressure element 130. In this manner, upper pressure element 130 can positively engage and exert pressure against first plastic strapping end 81 upon adhering the melted strapping portions together (as shown in FIG. 7). The spring loading of upper pressure element 130 facilitates application of uniform pressure across the first and second plastic strapping ends during welding. In another embodiment, upper pressure element 130 is disposed within housing 101 such that upper pressure element 130 also exerts pressure against first plastic strapping end 81 upon positioning of heating element 110 into its engaged heating position. Thus, in operation, upper pressure element 130 alternately exerts and releases downward pressure on at least first plastic strapping end 81.

In the preferred embodiment, lower pressure element 140 (shown in FIGS. 4 through 8) is disposed below and proximate to housing opening 104 and in operable alignment with upper pressure element 130. In a preferred embodiment, lower pressure element 140 is movable in the vertical direction between a disengaged position (shown in FIG. 4) and an engaged position (shown in FIG. 5), with lower pressure element 140 being raised into its engaged position above the height of its disengaged position.

As shown in FIG. 4, the disengaged position of lower pressure element 140 allows for initial insertion of the plastic strapping and relocation of heating element 110 into its engaged position between the two ends of plastic strapping.

As shown in FIG. 5, upper and lower pressure elements 130 and 140, respectively, intermittently force at least a portion of the first and second ends of plastic strapping 80 into operable contact with portions of top 111*a* and bottom 111*b* surfaces of element 111 of heating element 110 (when in its engaged position) so as to partially melt portions of said first plastic strapping end 81 and second plastic strapping end 82.

As shown in FIG. 6, upper and lower pressure elements 130 and 140 at least partially disengage first and second ends of said plastic strapping 80 from heating element 110 so as to facilitate retraction of heating element 110 into its disengaged position. Thus, allowing heating element 110 to withdraw from its engaged heating position with minimal resistance and damage to the plastic strapping from uneven heating.

As shown in FIG. 7, after removal of heating element 110, upper and lower pressure elements 130 and 140 also force the now partially melted portions of first and second plastic strapping ends 81 and 82 sealing contact.

As shown in FIG. 8, once upper pressure element 130 and lower pressure element 140 are in their disengaged positions with heating element 110 in its disengaged position, the plastic strapping is removed.

Thus, as shown in these figures, the upper and lower pressure elements sequentially exert pressure upon the plastic strapping ends during heating by heating element 110 and direct attachment of the melted portions of the plastic strapping ends after the heating element has been relocated to its retracted position. Further, the horizontal mobility of lower pressure element 140 avoids the requirement found in the prior art that the second (lowermost) piece of plastic strapping be tensioned. The horizontal motion of lower pressure element 140 is facilitated by sealing actuation assembly via bar 141 which raises and lowers lower pressure element 140 in association with roller 142 and guide 143. Operation of sealing actuation assembly 200 is described in detail hereinbelow.

Other various alternate embodiments of the present invention in which the upper and lower pressure elements 130 and 140 function differently are contemplated. For instance, upper pressure element 130 could be configured for horizontal movement in the manner described with respect to the lower pressure element hereinabove. In one potential embodiment in which both pressure elements move horizontally in a facilitated manner, sealing actuation assembly 200 would include bars, guides and the like for independent operation of each pressure element. Other modifications to sealing actuation assembly 200 will be described hereinbelow.

Figure 9A:
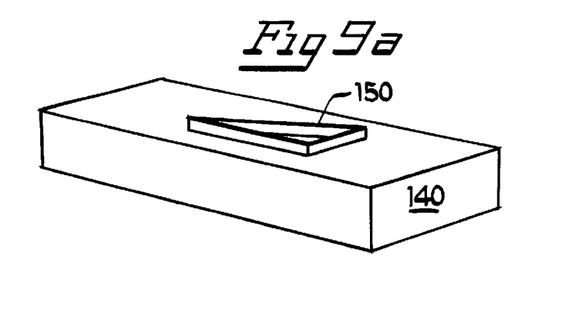
FIGS. 9a and 9b of the drawings are perspective and side elevational views, respectively of an embossing member disposed on the face of one or both of the pressure elements designed to make an imprint on the plastic strapping.
Figure 9B:
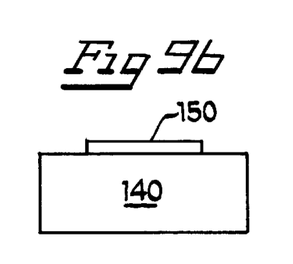

As shown in FIGS. 9*a* and 9*b*, in one embodiment of the present invention, one of upper pressure element 130 and lower pressure element 140 may include embossing member 150 operably disposed thereon so as to imprint an indicia on a portion of at least one of the first and second ends of plastic strapping 80. This indicia may be used to determine whether a strapped package has been tampered with or opened since sealing or merely to indicate the source of the goods so bundled.

Sealing actuation assembly 200 controls and sequences operations (as shown in FIGS. 4 through 8) associated with the heat sealing of the first and second ends of plastic strapping 80. As discussed above, sealing actuation assembly 200 facilitates a unidirectional operation of manual lever 120. This unidirectional operation minimizes variations in operation and sealing due to various end-users manual dexterity, strength, perception of time, etc. For instance, the unidirectional manual cycle avoids inadvertent dwell time between forward and rearward lever strokes, complex operation requirements, and variations in forward and rearward torque. Furthermore, the unidirectional manual cycle allows the user to determine whether or not a cycle has been completed by the location of the manual lever. Yet further, the sealing actuation assembly facilitates control of apparatus 100 toward fully utilizing the various rotational components of the apparatus toward ensuring proper time allocation amongst the plurality of steps conducted by apparatus 100 to acheive heat sealing of the plastic strapping. Additional advantages will become apparent to those of ordinary skill in the art having the present specification, drawings and claims before them.

As shown in FIG. 4, sealing actuating assembly 200 is operably connected to and controls heating element 110, upper pressure element 130 and lower pressure element 140 through the unidirectional, rotational cycle, to, in turn, weld portion 86 of first plastic strapping end 81 to portion 87 of second plastic strapping end 82. In one embodiment, upon completion of the unidirectional rotational cycle, sealing actuation assembly 200 further rotates to reset itself for a subsequent like cycle of control and sequencing. In another preferred embodiment, inasmuch as the actual heat sealing operation has been completed and the plastic strapping presumably removed from housing 101, this rotation of manual lever 120 may occur in a direction opposite to that of the unidirectional rotational cycle.

Sealing actuation assembly 200 is driven by a rotation actuation member, such as manual lever 120 disposed on the exterior of housing 101. Manual lever 120 has a starting position (shown in FIG. 1) and a finishing position (shown in FIG. 2) wherein rotation of manual lever 120 in one direction from its starting to its finishing position prompts a complete sequence of heat sealing operations via sealing actuation assembly 200.

Manual lever 120 is operably connected to primary rotary element 201, which in a preferred embodiment comprises a primary gear 201 having seventy-six teeth operably disposed thereon. In one embodiment, manual lever 120 is directly attached to primary rotary element 201. Alternately, such connection between the lever and primary rotary element 201 may also be accomplished via an over-running clutch bearing 202 to allow return of manual lever 120 to its starting position without rotating primary rotary element 201.

It is also possible that the end-user will not fully rotate manual lever 120 between its starting and finishing positions thus, not completing the full sequence of operations. Accordingly, as shown in FIGS. 10 through 15, in one preferred embodiment, apparatus 100 further includes first and second means for precluding partial cycling of the operations by precluding movement of manual lever 120 back to its starting position until manual lever 120 has been advanced to its finishing position.

First precluding means (as shown in FIG. 10) includes ratchet 301, first spring-biased pawl 302 and pins 303 and 304. First spring-biased pawl 302 includes fulcrum 304 and spring detent 305 operably attached to the fulcrum to bias it. First spring-biased pawl 302 is operably disposed so as to engage teeth on ratchet 301. In turn, ratchet 301 is operably affixed to primary rotary element 201 to prevent rearward motion of this element until manual lever 120 is moved sufficiently forward to its finishing position. Pins 303 and 304 are disposed on the outward face of ratchet 301. Pin 304 is mounted at a position on the face of ratchet 301 that corresponds to the complete forward motion of the primary rotary element 201.

In a preferred embodiment (shown in FIGS. 10 through 15), apparatus 100 further includes second means for precluding partial cycling during the return stroke of manual lever 120 to its starting position. Second precluding means includes ratchet 401, second spring-biased pawl 402 and pins 403 and 404. The teeth on ratchet 401 are turned opposite to the direction of the teeth on ratchet 301, thus, facilitating prevention of forward rotation of the primary rotary element during the return stroke of manual lever 120. In another embodiment including both first and second precluding means, pins 304 and 403 can be combined into a single pin (not shown) that conducts all of the operations described above with respect to both pins 304 and 403.

In a preferred embodiment, ratchets 301 and 401 are formed from the same circular blank by laser cutting the teeth about the periphery of the blank in the first tooth direction required for ratchet 301 and then in the second tooth direction required for ratchet 401.

FIG. 10 shows manual lever 120 in its starting position ready to advance toward its finished position with the first precluding means engaged to prevent rearward motion of the manual lever and the second precluding means disengaged to allow forward motion of the manual lever. In particular, first spring-biased pawl is engaging teeth on ratchet 301 and second spring-biased pawl 402 has been biased out of engagement with ratchet 401. In this manner, manual lever 120 can be rotated only in its forward direction.

Figure 11:
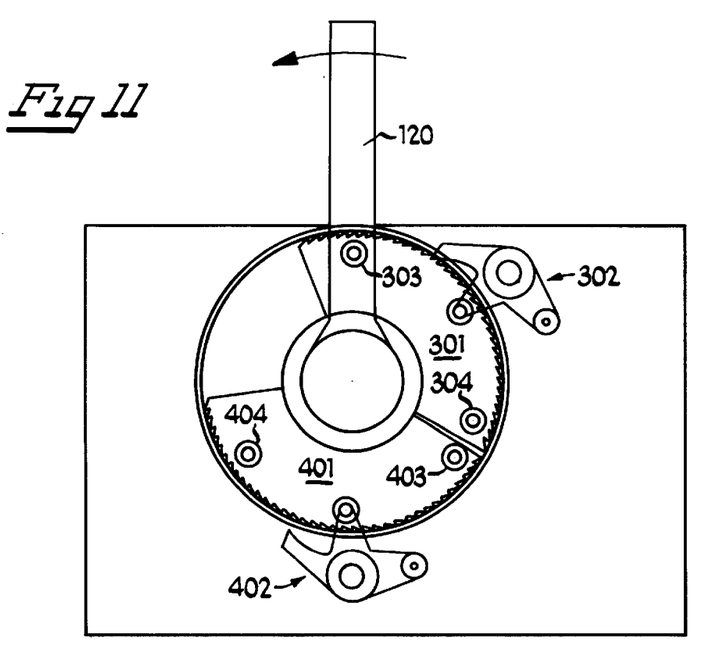
FIG. 11 of the drawings is an elevational side view of the first and second means for precluding partial rotation of the manual lever, showing, in particular, the manual lever further advanced from its starting position toward its finished position with the first precluding means still engaged and the second precluding means disengaged.

FIG. 11 shows manual lever 120 advanced from its starting position toward its finished position with the first precluding means still engaged and the second 10 precluding means disengaged. As shown, pins 304 and 404 have advanced approximately half-way toward operable contact with respective ones of first spring-biased pawl 302 and second spring-biased pawl 402 toward, respectively, disengaging and engaging same with their associated ratchets 301 and 401.

FIG. 12 shows manual lever 120 immediately prior to its finished position. In this position, second pin 304 of first precluding means is poised to disengage first spring-biased pawl 302 of first precluding means from its associated ratchet 301.

Likewise, second pin 404 of the second precluding means is poised to engage second spring-biased pawl 402 of the second precluding means with its associated ratchet 401 to allow rearward movement of manual lever 120.

FIG. 13 shows manual lever 120 in its finished position with the first precluding means disengaged to allow rearward motion of the manual lever and the second precluding means engaged to prevent further forward motion of the manual lever after pins 304 and 404 have operated against their pawl to reconfigure apparatus 100 to permit rearward motion of manual lever 120.

FIG. 14 shows manual lever 120 returning toward its starting position with the first precluding means disengaged and the second precluding means engaged to prevent forward motion of manual lever 120. In this manner the precluding means prevent partial actuation of the heat sealing sequence.

FIG. 15 shows manual lever 120 immediately prior to returning to its starting position with first pin 303 of first precluding means is poised to engage first spring-biased pawl 302 of first precluding means with its associated ratchet 301.

Likewise, first pin 403 of the second precluding means is poised to disengage second spring-biased pawl 402 of the second precluding means from its associated ratchet 401 to allow forward movement of manual lever 120 toward another heat sealing cycle.

A particular cycle having a particular stroke length is shown in FIGS. 10 through 15, however, by repositioning pins 303, 304, 403 and 404 any rotational cycle lengths can be achieved. Furthermore, only one or the other of these first and second precluding means would be utilized in an application that did not require either forward or rearward rotation.

Returning to FIG. 4 and sealing actuation assembly 200, primary rotary element 201 cooperates with secondary gear 202 mounted on shaft 203. In a preferred embodiment, secondary gear 202 has 18 teeth for a gear ratio between primary and secondary gears of approximately 4.2:1. Of course, different gear ratios may be utilized. However, this ratio was selected to facilitate the operation of a complete cycle of heat sealing during unidirectional motion of manual lever 120. This unidirectional cycle provides a significant advantage over the prior art by, among other aspects, minimizing the effect of any particular user's dexterity, strength and perception of time to affect the actual heat sealing operation.

Secondary gear 202 is fixed to shaft 203 along with heating element cam 204 and pressure element cam 205, both of which are mounted so as to preclude any relative rotation between the cams and secondary gear 202 to ensure appropriate cycling of the various heat sealing operations.

Heating element cam 204 is operably connected to heating element 110 via bar 210. Bar 210 is spring-biased toward the engaged heating position of heating element 110 and is pivoted about fixed pin 211. Cam roller follower 212 is mounted on bar 210 such that cam roller follower 212 follows the cam face of heating element cam 204 to alternately prevent and allow heating element 110 move between its retracted and engaged heating positions in accordance with said control and sequence of the operations of heat sealing apparatus 100.

The various movements of bar 210 and cam roller follower 212 about the face of heating element cam 204 are shown in FIGS. 4 through 8. Accordingly, the face of heating element cam 204 has variously shaped surfaces that are configured to ensure that heating element 110 remains in its engaged heating position a sufficient time to only partially melt plastic strapping 80. This timing is dependent on the type of plastic strapping material used, the temperature of the heating element and, to a lesser extent due to sealing actuation assembly 200, on the speed at which manual lever 120 is rotated.

Similarly, as shown in FIG. 4, pressure element cam 205 is operably connected to lower pressure element 140 via fulcrum 220 which rotates about fixed pin 221. Fulcrum 220 has a cam roller follower 220a in operable contact with the face of pressure element cam 205 and is biased upward and downwardly by the contours of that cam. In turn, second fulcrum end 220b is hingedly connected to bar 141 and controlled by guide 222, which in cooperation with guide 143, directs the horizontal movements of lower pressure element 140. The movements of bar 220, cam roller follower 220a and second fulcrum end 220b about the face of pressure element cam 205 are shown in FIGS. 4 through 8. Accordingly, the face of pressure element cam 205 has variously shaped surfaces that are configured to ensure that lower pressure element 140 moves in and out of its engaged and disengaged positions in synchronization with heating element 110. Thus, like the heating element, the timing for the lower pressure element 140 is dependent on the type of plastic strapping material, temperature of the heating element and to a lesser extent on the speed at which manual lever 120 is rotated.

In another embodiment, the pressure element cam 205 may be configured to operate upper pressure element 130 rather than lower pressure element 140. In yet another embodiment, in which it could be desired to have both the upper and lower pressure elements move, an additional, like pressure element cam is operably mounted on shaft 203 and operably connected to the other pressure element in a manner similar to the connection to lower pressure element 140, as described above.

In operation, once the plastic strapping has been placed within housing 101, operation of apparatus 100 can begin. In particular, the end-user rotates manual lever 120 beginning from its starting position (shown in FIG. 1) to its finished position (shown in FIG. 2) in the unidirectional manner. This rotation of manual lever 120, in turn prompts rotation of primary gear 201 and secondary gear 202 result in the rotation of heating element cam 204, which presents its flat face to cam roller follower 212, in turn moving bar 210 prompting heating element 110 to move horizontally into its engaged heating position between first and second plastic strapping ends. Simultaneously, pressure element cam 205 pushes down on fulcrum 220, which pull bar 141 and, in turn, lower pressure element 140 upward, thus, pressing second plastic strapping end against the lower face of heating element 111. In a preferred embodiment, first plastic strapping end 81 is held in operable association with heating element 111 by operation of its tensioned condition. In another embodiment where upper pressure element 130 is disposed in a lower position, the raising of lower pressure element 140 into second plastic strapping end 82 and heating element 111 causes upper pressure element 130 to press downward against first plastic strapping end onto the upper face of heating element 111. As the end-user continues rotation, the faces of the cams will continue this positioning of the elements for a sufficient amount of time to partially melt portions of plastic strapping 80. These operation result in the configuration shown in FIG. 5 of the drawings, described more fully hereinabove.

As shown in FIG. 6, the end-user's continuation of forward rotation causes lower pressure element 140 to be partially lowered by operation of bar 141, fulcrum 220, cam roller follower 220a, pressure element cam 205, secondary gear 202 and primary gear 201. This lowering of lower pressure element 140 releases some of the pressure on the first and second ends of plastic strapping 80 to facilitate retraction of heating element 110 to its disengaged position.

As shown in FIG. 7, still continuing the forward rotation of manual lever 120, heating element 110 is completely withdrawn and lower pressure element 140 has been raised by bar 141, fulcrum 220 as biased by cam roller follower 220a in cooperation with pressure element cam 205 as rotated by operation of the associated gears. As shown, lower pressure element 140 has also been raised, in turn, causing upper and lower pressure elements 130 and 140 to press first and second plastic strapping ends 81 and 82 together so as to adhere them one to the other. As forward rotation of manual lever 120 continued to its finishing position, as shown in FIG. 8, lower pressure element 140 is lowered into its disengaged position and sealed plastic strapping can be removed. In this manner, all operations of the heat sealing apparatus are performed during only the forward rotation of manual lever 120 thus avoiding the numerous potential problems caused by requiring a bi-directional manual operation of such a device, as described above. As discussed above, in a preferred embodiment, after the completion of the complete heat sealing cycle, manual lever 120 is rotated in the reverse direction to return the apparatus to its starting configuration.

Accordingly, this apparatus heat seals plastic strapping while eliminating many of the concerns associated with manual operation of the sequencing of the unit via a lever. Initially, all operations are conducted during the forward rotation of manual lever 120 through the use of sealing actuation assembly 200. Further, partial forward operation is precluded by first precluding means that requires complete forward rotation of manual lever 120 before any reverse rotation can be performed. Additional, partial rearward movement of the lever is precluded by second precluding means; ensuring that apparatus 100 is fully reset by the operator prior to commencing another sealing operation. Yet further, horizontal motion of the lower pressure element avoids the need to tension the lower piece of plastic strapping, thus leading to better engagement between second end 82 of plastic strapping 80 and the lower face of heating element 110 and, in turn, better melting and affixation between the first and second ends. Still further, the housing minimizes the potential for user injury and also the possibility of inadvertent ejection of the plastic strapping during the heating operation.

The foregoing description and drawings are merely to explain and illustrate the invention and the invention is not limited thereto except insofar as the appended claims are so limited, as those skilled in the art who have the disclosure before them will be able to make modifications and variations therein without departing from the scope of the invention.

What is claimed is:

1. An apparatus for heat sealing a first end of plastic strapping to a second end of plastic strapping, each of said first and second ends of plastic strapping having a longitudinal axis, a first edge, a second edge opposite and distally-spaced from said first edge, both of said first and second edges being substantially parallel to said longitudinal axis and operably positioned between said first and second ends, said apparatus comprising:

a housing having an interior, an exterior and an opening, said opening being disposed so as to receive at least a portion of both of said first and second ends of plastic strapping with a portion of said first end of plastic strapping being orientatable on top of a portion of said second end of plastic strapping within said housing interior;

a sealing actuation assembly, at least of portion of said sealing actuation assembly being operably positioned within said housing for controlling and sequencing operations associated with said heat sealing of said first and second ends of said plastic strapping;

a heating element operably disposed within said interior of said housing for positioning between said first and second ends of plastic strapping, said heating element operably connected to said sealing actuation assembly and disposed so as to move between an engaged heating position and a retracted position, said engaged position orienting said heating element operably between said first and second ends of said plastic strapping and said retracted position orienting said heating element in a position isolated from said first and second ends of said plastic strapping, said heating element having a top surface and a bottom surface opposite said top surface;

an upper pressure element for alternately exerting and releasing downward pressure on at least said first end of said plastic strapping, said upper pressure element being operably associated with said sealing actuation assembly, said upper pressure element having a disengaged position during which said downward pressure is released, for facilitating placement and later removal of said first and second ends of said plastic strapping as well as for enabling facilitated movement of said heating element between said engaged heating position and said retracted position, said upper pressure element intermittently forcing said partially melted portion of said first end of plastic strapping into sealing contact with said partially melted portion of said second end of plastic strapping upon repositioning said heating element into its retracted position; and a lower pressure element for alternately exerting and releasing upward pressure on at least said second end of said plastic strapping, said lower pressure element being operably associated with said sealing actuation assembly, said lower pressure element having a disengaged position during which said upward pressure is released, for facilitating placement and later removal of said first and second ends of said plastic strapping as well as for enabling facilitated movement of said heating element between said engaged heating position and said retracted position, said lower pressure element intermittently forcing at least said portions of said first and second ends of plastic strapping into operable contact with at least a portion of said top and bottom surfaces of said heating element, respectively, upon positioning of said heating element into said engaged position so as to partially melt said portions of said first and second ends, said lower pressure element also intermittently forcing said partially melted portion of said second end of plastic strapping into sealing contact with said partially melted portion of said first end of plastic strapping upon repositioning said heating element into its retracted position;

said lower pressure element sequentially exerting upward pressure upon at least one of said first and second ends of plastic strapping, during the heating of same by said heating element and again, in cooperation with said upper pressure element exerting downward pressure, during direct attachment of said melted portions after said heating element is relocated to its retracted position, said upper pressure element and said lower pressure element releasing said downward and upward pressure respectively while facilitating said placement of said first and second ends of said plastic strapping between said upper and lower pressure elements, said lower pressure element engaging at least one of said first and second ends with said heating element, at least partially disengaging said first and second ends of said plastic strapping from said heating element so as to facilitate retraction of said heating element, and said upper pressure element and lower pressure element pressing said melted portions of said first and second ends of said plastic strapping so as to weld one to the other; and a rotation actuation member operably associated with said sealing actuating assembly for imparting rotation to said sealing actuation assembly;

said sealing actuating assembly controlling and sequencing the operations of said heating element, said upper pressure element and said lower pressure element through a unidirectional, rotational cycle, to, in turn, weld said portion of said first end of plastic strapping to said portion of said second end of plastic strapping.

2. The heat sealing apparatus of claim 1 wherein said upper pressure element, in cooperation with said lower pressure element, intermittently forces at least a portion of said first and second ends of plastic strapping into operable contact with at least a portion of said top and bottom surfaces of said heating element, respectively, upon positioning of said heating element into said engaged position so as to partially melt said portions of said first and second ends.

3. The heat sealing apparatus of claim 1 in which said sealing actuation assembly, upon completion of said unidirectional rotational cycle, further rotates to reset said sealing actuating assembly for a subsequent like cycle of control and sequencing.

4. The heat sealing apparatus of claim 1 wherein said upper pressure element comprises a stationary plate.

5. The heat sealing apparatus of claim 1 wherein said upper pressure element comprises a movable platen.

6. The heat sealing apparatus of claim 5 wherein said movable platen moves vertically.

7. The heat sealing apparatus of claim 1 wherein said lower pressure element comprises a stationary plate.

8. The heat sealing apparatus of claim 1 wherein said lower pressure element comprises a movable platen.

9. The heat sealing apparatus of claim 8 wherein said movable platen moves vertically.

10. The heat sealing apparatus of claim 8 wherein said upper pressure element also includes a movable platen.

11. The heat sealing apparatus of claim 8 wherein said upper pressure element comprises a stationary platen.

12. The heat sealing apparatus of claim 1 wherein at least one of said upper pressure element and said lower pressure element includes an embossing member operably disposed thereon so as to imprint an indicia on said portion of at least one of said first and second ends of said plastic strapping.

13. The heat sealing apparatus according to claim 1 wherein said sealing actuation assembly further includes a primary rotary element directly attached to said rotational actuation member towards said control and sequencing of said operations of said heat sealing apparatus.

14. The heat sealing apparatus according to claim 13 wherein said primary rotary element is a primary gear.

15. The heat sealing apparatus according to claim 13 wherein said sealing actuation assembly further includes a plurality of secondary rotary elements, each of said plurality of secondary rotary elements cooperating with said primary rotary element to control and sequence said operations of said heat sealing apparatus.

16. The heat sealing apparatus according to claim 15 wherein said plurality of secondary rotary elements includes a first gear in operable contact with said primary rotary element, said first gear being mounted on a shaft.

17. The heat sealing apparatus according to claim 16 wherein said plurality of secondary rotary elements further includes:

a heating element cam operably mounted to said shaft, said heating element cam being operably connected to said heating element and configured to move said heating element between said retracted and engaged heating positions in accordance with said control and sequence of said operations of said heat sealing apparatus; and at least one pressure element cam operably mounted to said shaft, said at least one pressure element cam being operably connected to at least one of said upper and lower pressure elements.

18. The heat sealing apparatus according to claim 1 wherein said rotational activation member comprises a manual lever operably mounted on said exterior of said housing, said manual lever having a starting position and a finishing position wherein rotation of said manual lever from said starting position to said finishing position prompts said controlling and sequencing of said operations.

19. The heat sealing apparatus according to claim 18 further comprising first means for precluding partial cycling of said operations of said heating element, said upper pressure element and said lower pressure element by precluding movement of said manual lever back to said starting position until said lever has been advanced to said finishing position.

20. The apparatus according to claim 19 wherein said first precluding means includes:

a first spring-biased pawl operably disposed so as to engage teeth on said primary gear to prevent rearward motion of said primary gear;

a first pin disposed on an outer face of said primary gear positioned so as to disengage said first spring-biased pawl from the teeth on said primary gear upon movement of said manual lever to said finishing position; and a second pin disposed on said outer face of said primary gear positioned so as to re-engage said first spring-biased pawl with the teeth on said primary gear upon movement of said manual lever to said starting position.

21. The apparatus according to claim 19 further comprising second means for precluding partial cycling of said operations of said heating element, said upper pressure element and said lower pressure element by precluding movement of said manual lever to said finishing position during a return stroke toward said starting position until said manual lever has been returned to said starting position.

22. The apparatus according to claim 21 wherein said second precluding means includes:

a second spring-biased pawl operably disposed so as to engage teeth on said primary gear to prevent forward motion;

a third pin disposed on an outer face of said primary gear positioned so as to engage said first spring-biased pawl with the teeth on said primary gear upon movement of said manual lever to said finishing position; and a fourth pin disposed on said outer face of said primary gear positioned so as to disengage said first spring-biased pawl from the teeth on said primary gear upon movement of said manual lever to said starting position.

23. The heat sealing apparatus according to claim 1 wherein said heating element moves substantially horizontally between said retracted and engaged heating positions and substantially perpendicular to said longitudinal axis of said plastic strapping, said heat sealing apparatus further including a vertically-orientable plate operably mounted on said housing so as to allow horizontal insertion of said first and second ends of said plastic strapping prior to said heat sealing and to prevent said first and second ends of said plastic strapping from being pushed horizontally out of said housing during said substantially horizontal movement of said heating element into said engaged heating position between said first and second ends.

24. The heat sealing apparatus according to claim 23 wherein said vertically-orientable plate further serves to substantially close said housing opening to, in turn, substantially preclude access by an end user to said heating element to minimize potential for injury from said heating element.

25. The heat sealing apparatus of claim 1 wherein said housing opening is configured so as to substantially preclude access by an end user to said heating element to minimize potential for injury from said heating element.

* * * * *

UNITED STATES PATENT AND TRADEMARK OFFICE
CERTIFICATE OF CORRECTION

PATENT NO. : 5,863,378
DATED : January 26, 1999
INVENTOR(S) : Srichand Sitaldas Panjwani
Timothy H. Nelson It is certified that error appears in the above-indentified patent and that said Letters Patent is hereby corrected as shown below:

Col. 13, line 61   Delete "10".

Col. 14, line 6    "Likewise, second pin..." does not start a new paragraph.

Col. 14, line 27   "Likewise, first pin..." does not start a new paragraph.

Signed and Sealed this

Second Day of May, 2000

Attest:

Q. TODD DICKINSON

*Attesting Officer*             *Director of Patents and Trademarks*